United States Patent [19]

Kawakami et al.

[11] Patent Number: 4,590,119

[45] Date of Patent: May 20, 1986

[54] POLYESTER FILM AND MAGNETIC RECORDING MEDIUM THEREFROM

[75] Inventors: Ken-ichi Kawakami; Toshiya Yoshii, both of Otsu; Masaru Suzuki, Ito; Hotsuma Okasaka, Mishima, all of Japan

[73] Assignee: Toray Industries, Inc., Tokyo, Japan

[21] Appl. No.: 622,771

[22] Filed: Jun. 20, 1984

[30] Foreign Application Priority Data

| Jul. 15, 1983 | [JP] | Japan | 58-128004 |
| Sep. 29, 1983 | [JP] | Japan | 58-181246 |
| Oct. 14, 1983 | [JP] | Japan | 58-190969 |

[51] Int. Cl.$^4$ .............................. G11B 5/64; G11B 5/66
[52] U.S. Cl. ........................ 428/216; 360/134; 360/135; 360/136; 427/128; 427/131; 427/132; 428/215; 428/323; 428/327; 428/328; 428/329; 428/336; 428/422; 428/480; 428/694; 428/900; 524/605; 524/496
[58] Field of Search .............. 428/480, 422, 694, 323, 428/327, 336, 900, 215, 216, 328, 329; 528/308.2, 308.1, 302, 491, 486; 524/496, 605; 360/134–136; 427/132, 131, 128; 523/181

[56] References Cited

U.S. PATENT DOCUMENTS

| 3,136,655 | 6/1984 | Wolinski | 528/302 |
| 3,515,626 | 6/1970 | Duffield | 428/325 |
| 3,629,202 | 12/1971 | Gilkey | 528/486 |
| 3,759,855 | 9/1973 | Schnegg | 528/302 |
| 4,096,109 | 6/1978 | Watanabe | 523/181 |
| 4,138,386 | 2/1979 | Motegi | 428/694 |
| 4,198,458 | 4/1980 | Mitsuishi | 428/409 |
| 4,364,885 | 12/1982 | Kanai | 428/484 |
| 4,435,546 | 3/1984 | Bier | 528/302 |
| 4,444,807 | 4/1984 | Masakawa | 427/132 |

*Primary Examiner*—Ellis P. Robinson
*Attorney, Agent, or Firm*—Austin R. Miller

[57] ABSTRACT

An oriented polyester film is provided according to the present invention which contains, per 100 parts by weight of a polyester, (A) 0.005–2 parts by weight of fine particles having average size of 0.05–3 μm, and
(B) 0.005–2 parts by weight of at least one compound selected from the group consisting of high aliphatic monocarboxylic acids having 10–33 carbon atoms and esters thereof.

Herein also disclosed is a composite polyester film which comprises a resin layer of copolyester or copolyester ether containing an ester-forming alkali metal salt of sulfonic acid compound, the layer being laminated on at least one side of the oriented polyester film as a substrate. The present invention further provides a magnetic recording medium comprising the oriented polyester film or the composite polyester film as a base.

The novel films of the present invention have a surface satisfying three properties: flatness, slipperiness and adhesion, which are considered unable to be attained with a conventional polyester film. Furthermore, a magnetic recording medium having good electromagnetic conversion and running properties can be obtained from the films in the invention.

29 Claims, No Drawings

POLYESTER FILM AND MAGNETIC RECORDING MEDIUM THEREFROM

BACKGROUND OF THE INVENTION

1. Field of the Invention

This invention relates to a polyester film and a magnetic recording medium comprising it as a base. Particularly, it relates to a polyester film whose surface has excellent flatness, slipperiness and adhesion and a magnetic recording medium comprising the polyester film as a base.

2. Description of the Prior Art

Recently, polyester films have markedly been developed in the fields for applications to magnetic recording media such as magnetic tapes and disks, and to capacitors, photographs, microfilms, packagings and the like.

In these applications of polyester films, strictly controlled surface properties are required For example, in the applications to magnetic recording media such as magnetic tapes, a base film must have, at the same time, excellent flatness for good recording and playback qualities (herein referred to as "electromagnetic conversion property"), excellent slipperiness for good head contact and running property, and excellent adhesive property for good adhesion of a magnetic layer in order to maintain good electromagnetic conversion and running properties. However, conventional polyester films have hardly satisfied all the three properties, that is, flatness, slipperiness and adhesion, simultaneously.

There have been proposed polyester films containing internal particles precipitated in the polyester-forming reaction system and inert particles incorporated after polymerization as disclosed in U.S. Pat. Nos. 4,096,109 and 4,138,386, a laminated film of which both sides have different properties, respectively, as disclosed in U.S. Pat. No. 3,515,626, and a biaxially stretched polyester film with a coating as disclosed in U.S. Pat. No. 4,364,885.

However, a film surface having simultaneously flatness and slipperiness could not have been obtained in the prior art. Furthermore, such laminated films and coated films as described above, which have one surface with flatness and easily adhesive property and another surface with good slipperiness formed by lamination or coating, had such a transcription defect between one surface and another so that the properties of each surface could not be maintained. Briefly, a film having all the three properties, that is, flatness, slipperiness and adhesion, have not been obtained in the prior art, in other words, a magnetic tape having both good running and electromagnetic conversion properties could not have been obtained from those films of the prior art.

SUMMARY OF THE INVENTION

It is an object of the present invention to provide a polyester film having the aforementioned three surface properties, i.e. flatness, slipperiness and adhesion.

An another object of the invention is to provide a magnetic recording medium comprising as a base the polyester film with such excellent properties as described above.

A still further object of the invention is to provide a magnetic recording medium having excellent running and electromagnetic conversion properties.

According to the present invention there are provided:

(1) an oriented polyester film containing, per 100 parts by weight of a polyester,
 (A) 0.005–2 parts by weight of fine particles having average size of 0.05–3 μm, and
 (B) 0.005–2 parts by weight of at least one compound selected from the group consisting of high aliphatic monocarboxylic acids having 10–33 carbon atoms and esters thereof;

(2) a composite polyester film comprising
 (a) the oriented polyester film of (1) as a substrate, and
 (b) a resin layer of copolyester or copolyester ether containing an ester-forming alkali metal salt of sulfonic acid compound, the layer being laminated on at least one side of the oriented polyester film; and (3) a magnetic recording medium comprising
 (i) the oriented polyester film of (1) or the composite polyester film of (2) as a base film, and
 (ii) a magnetic layer formed thereon.

DESCRIPTION OF THE PREFERRED EMBODIMENTS

The term polyester is herein referred to a polyester consisting of an aromatic dicarboxylic acid as a main acid component and an alkylene glycol as a main glycol component.

Illustrative examples of the aromatic dicarboxylic acid include terephthalic acid, isophthalic acid, naphthalene dicarboxylic acid, diphenoxyethane dicarboxylic acid, diphenyl dicarboxylic acid, diphenylether dicarboxylic acid, diphenylsulfone dicarboxylic acid, diphenylketone dicarboxylic acid, anthracene dicarboxylic acid, α,β-bis(2-chlorophenoxy)ethane-4,4'-dicarboxylic acid and the like. Terephthalic acid is particularly preferred.

Illustrative examples of the alkylene glycol include ethylene glycol, trimethylene glycol, tetramethylene glycol, pentamethylene glycol, hexamethylene glycol, hexylene glycol and the like. Ethylene glycol is particularly preferred.

The polyester may of course be a homopolyester or a copolyester (copolymerised polyester). Copolymerizing components which can be used for preparing the copolyester include, for example, diols such as diethylene glycol, propylene glycol, neopentyl glycol, polyalkylene glycol, p-xylylene glycol, 1,4-cyclohexane dimethanol, 5-sodium sulphoresorcin and the like, dicarboxylic acids such as adipic acid, sebacic acid, phthalic acid, isophthalic acid, 2,6-naphthalene dicarboxylic acid, 5-sodium sulphoisophthalic acid and the like, polyfunctional dicarboxylic acids such as trimellitic acid, pyromellitic acid and the like, oxycarboxylic acids such as p-oxyethoxy benzoic acid and the like.

The polyester may of course contain known additives, for example antistatic agent, heat stabilizer, ultraviolet absorber or the like, in an amount without impairing the advantages of the invention.

The fine particles contained in the polyester of the invention are selected from the group consisting of known internal particles, known inert particles and organic particles insoluble in the polyester and they may also be used in a mixture.

The internal particles may be formed in the polyester-forming reaction system due to bonding of at least one metallic compound added to the system, for example calcium, magnesium or lithium compound, or phosphorus compound with a component constituting the polyester.

The inert particles may be chemically inert oxides or inorganic salts of an element or elements selected from Groups II, III and IV in the Periodic Table, for example, natural or synthetic calcium carbonate, wet or dry silica (silicon dioxide), aluminium silicate (kaolinite), barium sulfate, calcium phosphate, talc, titanium dioxide, aluminium oxide, aluminium hydroxide, calcium terephthalate, calcium silicate or the like.

The organic particles insoluble in the polyester may be any fine particles of fluorinated polymers or crosslinked polymers.

The average size of the fine particles should be in the range of 0.05–3 μm and may preferably be 0.1–2 μm. With the finer particles of less than 0.05 μm in size the resulting film has insufficient slipperiness, on the other hand the sufficient flatness can not be obtained with the particles having average size of more than 3 μm.

The amount of the fine particles present in the polyester should be in the range of 0.005–2 parts by weight per 100 parts by weight of the polyester. Preferred range of the amount is 0.005–1 parts by weight with 0.01–0.5 parts by weight being more preferable. When the amount falls in the range less than the abovementioned lower limit the coefficient of friction between films or between film and metal increases resulting in insufficient slipperiness. On the other hand, coarse particles will frequently be generated and the surface roughness will increase to impair the flatness of the film to be obtained when the amount is larger than the aforementioned upper limit. A film containing the fine particles in an amount falling without the suitable range will not give a magnetic tape having good running and electromagnetic conversion properties.

The higher aliphatic monocarboxylic acid having 10–33 carbon atoms in the invention includes capric acid, lauric acid, stearic acid, nonadecanoic acid, arachic acid, behenic acid, melissic acid, lignoceric acid, cerotic acid, montanic acid, hentriacontanoic acid, petroselinic acid, oleic acid, erucic acid, linoleic acid and a mixture thereof. The higher aliphatic monocarboxylic acid containing 18–33 carbon atoms, particularly 20–32 carbon atoms, is preferable since it may markedly improve the slipperiness of the film to be obtained therefrom.

The ester of the higher aliphatic monocarboxylic acid may be obtained by partial or complete esterification of the aforementioned higher aliphatic monocarboxylic acid with monovalent or divalent straight or branched alcohol containing 2–33 carbon atoms. Examples are ethylene glycol montanate ester, ethyl montanate, ceryl montanate, stearyl behenate, octacosyl lignocerate, melissyl lignocerate, ceryl lignocerate, myricyl cerotate, ceryl cerotate or the like. Montan wax, carnauba wax, bees wax, candelilla wax, rice wax, insect wax or the like, which may be obtained from natural sources, may also be preferable in the invention. Further, the acid component of the ester may be straight or branched.

In the invention, when the higher aliphatic monocarboxylic acid contains less than 10 carbon atoms, severe "bleed-out" to the film surface occurs and the adhesion of the film markedly deteriorates. On the other hand, sufficient slipperiness can not be obtained with the acid containing more than 33 carbon atoms.

Preferred ester of the higher aliphatic monocarboxylic acid in the invention has as its constituents an acid and an alcohol, both having 18–33 carbon atoms, preferably 20–32 carbon atoms, because of excellent slipperiness.

The content of the high aliphatic acid or ester thereof in the polyester of the invention is, per 100 parts by weight of the polyester, 0.005–2 parts by weight, preferably 0.01–1 part by weight, more preferably 0.05–0.5 parts by weight, and most preferably more than 0.1 part by weight and up to 0.5 parts by weight. When the content is less than 0.005 parts by weight, flatness and/or slipperiness can hardly be obtained in the resulting film. On the other hand, severe "bleed-out" to the film surface is caused and the adhesion is adversely affected seriously.

As aforementioned, both the following essentials must necessarily be contained in the polyester of the invention:

A. fine particles, and
B. at least one high aliphatic monocarboxylic acid or ester thereof.

The component A or B alone can not attain the advantages to be desired in the invention. The reason why both A and B are essential to the invention is a synergistic effect wherein B acts as an aid for finely dispersing A in the polyester.

The "surface roughness ($R_a$)" in the invention, which is measured by a method described later, is in the range of 0.001–0.025 μm. Preferably, the range is 0.001–0.023 μm, more preferably 0.001–0.018 μm and most preferably 0.001–0.014 μm. When the surface roughness $R_a$ is less than 0.001 μm the film surface is too flat and easily scratched. On the other hand, the flatness tends to be impaired with $R_a$ of more than 0.025 μm. It will be difficult to obtain a magnetic tape having both good electromagnetic conversion and running properties from a film of which $R_a$ lies outside the abovementioned preferable range.

The "coefficient of static friction ($\mu_s$)" in the invention, which is measured by a method described later, is desirably in the range of 0.3–1. Preferably, the range is 0.4–0.9 and more preferably 0.4–0.8. When the coefficient of static friction $\mu_s$ is less than 0.3, side slip winding tends to occur during operation procedures. On the other hand, the slipperiness may often be insufficient and high speed film runability tends to deteriorate during processing courses with $\mu_s$ being more than 1.

The polyester film of the invention should be oriented. From an unoriented film, it is difficult to obtain the surface roughness and the coefficient of static friction falling within the aforementioned range. Furthermore, irregular thickness, low rigidity and low dimensional stability of such an unoriented film are fatal to the purpose of the present invention.

The orientation may be performed by any known method, for example uniaxial or biaxial stretching, with a biaxial orientation being preferred. In the invention the degree of orientation may desirably be defined according to the following conditions: that is, the resulting oriented film should have, in the uniaxial orientation, the birefringence in plane ($\Delta n$) falling within the range of 0.02–0.25, preferably 0.06–0.20. Alternatively, in the biaxial orientation, $\Delta n$ should fall within the range of 0–0.15, preferably 0–0.10, the sum of in-plane refractive indices should fall within the range of 3.2–3.42 and the ratio of refractive indices in the thickness direction should fall within the range of 0.935–0.980.

The "birefringence in plane, $\Delta n$" herein refers to the absolute value of the difference between the refractive index in the longitudinal direction and the refractive index in the transverse direction of a film, which refractive indices are measured by an Abbe's refractometer using sodium D line at 25° C. under 65% RH. The "sum of in-plane refractive indices" herein refers to the sum of the refractive index in the longitudinal direction and the refractive index in the transverse direction of a film. The "ratio of refractive indices in the thickness direction" refers to the ratio of the refractive index (P) in the direction of thickness of a film to the refractive index (Q) in the direction of thickness of an amorphous film obtained by melt-pressing said film followed by quenching in water at 10° C., i.e. P/Q. When the degree of orientation is outside the abovementioned range, the flatness and slipperiness of the resulting film tend to deteriorate and the resulting magnetic tape therefrom have undesirable running and electromagnetic conversion properties.

The thickness of the oriented film of the invention is in the range of 3–125 μm, preferably 4–80 μm, more preferably 4–75 μm.

In the present invention, a resin layer of copolyester or copolyester ether containing an ester-forming alkali metal salt of sulfonic acid compound may be laminated on at least one side of the oriented film in order to further improve the adhesive property of the surface of the oriented polyester film.

The ester-forming alkali metal salt of sulfonic acid compound is herein an alkali metal salt of sulfoterephthalic acid, 5-sulfoisophthalic acid, 4-sulfophthalic acid, 4-sulfonaphthalene-2,7-dicarboxylic acid or the like. Such compound is preferably incorporated in the dicarboxylic acid component of the copolyester or copolyester ether resin skeleton. Preferred compound is 5-sodium sulfoisophthalate or sodium sulfoterephthalate. The amount of the ester-forming alkali metal salt of sulfonic acid compound present in the resin layer is in the range of more than 1% by mole and less than 40% by mole, preferably 2–20% by mole based on the amount of the dicarboxylic acid component. The adhesive property is insufficient with 1% by mole or less, while it is difficult to obtain ordinarily a product of high molecular weight with 40% by mole or more.

On the contrary, a compound without any alkali metal salt, for example, even isophthalic acid gives no good results, that is, the sufficient adhesion and slipperiness for the purpose of the invention can not be obtained.

Polyether components in the copolyester ether include, for example, polyethylene glycol, polypropylene glycol, polytetramethylene glycol, polyethylene propylene glycol, and the like. The amount of the polyether component present in the copolyester ether is preferably 2–80% by weight.

The copolyester or copolyester ether, which is a main constituent of the resin layer in the composite polyester film, consists of a dicarboxylic acid component and a glycol component.

The dicarboxylic acid component preferably comprises at least 60% by mole of aromatic dicarboxylic acids. Less than 60% by mole of aromatic dicarboxylic acids results in low adhesion property, therefore undesirable. Examples of the aromatic dicarboxylic acids include terephthalic acid, isophthalic acid, phthalic acid, 2,5-dimethylterephthalic acid, 1,4-naphthalene dicarboxylic acid, 2,6-naphthalene dicarboxylic acid, biphenyl dicarboxylic acid, 1,2-bis(phenoxy)ethane-p,p'-dicarboxylic acid and the like. Examples of nonaromatic dicarboxylic acids, which can be used in the invention, include oxalic acid, malonic acid, succinic acid, glutaric acid, adipic acid, sebacic acid, 1,2-cyclohexanedicarboxylic acid, 1,4-cyclohexanedicarboxylic acid and the like.

The glycol component preferably comprises 40% by mole or more of aliphatic or cycloaliphatic glycols. The aliphatic or cycloaliphatic glycols are preferably ethylene glycol, 1,3-propanediol, 1,4-butanediol, 1,4-cyclohexanedimethanol or the like. Preferably, more than 1% by mole and less than 60% by mole, more preferably 2–18% by mole of diethylene glycol or triethylene glycol may be copolymerized with the glycol component, wherein both diethylene glycol and triethylene glycol may be used. When one % by mole or less of diethylene glycol or triethylene glycol is used, the good adhesion property can not be obtained, while the surface of the resin layer of the composite film after lamination will lack in slipperiness and result in blocking, therefore undesirable when 60% by mole or more of diethylene glycol or triethylene glycol is used. From 2 to 18% by mole of the copolymerizing component is most preferable in the invention. Less than 40% by mole of aliphatic or cycloaliphatic glycol will result in insufficient adhesion and/or anti-blocking properties, therefore undesirable.

The molecular weight of the copolyester or copolyester ether is desirable to be in the range of 400–200,000.

The resin layer may contain, if necessary, 0.001–1 part by weight of internal particles and/or inert particles, which amount does not impair the desired effect of the invention.

The thickness of the resin layer in the composite polyester film is desirable to be in the range of 0.001–2 μm, preferably 0.005–1 μm. With less than 0.001 μm good adhesion can not be obtained. On the other hand, blocking tends to occur and slipperiness deteriorates with more than 2 μm.

The resin layer of the composite polyester film in the present invention has a surface roughness ($R_a$) in the range of 0.003–0.02 μm, preferably 0.004–0.015 μm, more preferably 0.004–0.01 μm. With less than 0.003 μm of the surface roughness the film is too flat and may easily be scratched during running. On the other hand, undesirable flatness is resulted with more than 0.02 μm.

In the present invention, a magnetic recording medium can preferably be obtained by providing a magnetic layer on at least one side of the base film of the invention. The magnetic layer may be any known type of either one formed by dispersing in an organic binder powdery magnetic materials such as $\gamma$-$Fe_2O_3$, $\gamma$-$Fe_2O_3$ doped with Co, $CrO_2$ and ferromagnetic alloys and applying the dispersion to the base film in a thickness of 0.3–5 μm, or one formed by a known method such as vacuum deposition, sputtering, ion plating and electroplating of Fe, Co, Ni or other ferromagnetic metal or magnetic alloy thereof in a thickness of 0.01–1.0 μm. The latter type is preferable, however, in order to advantageously effect the practice of the invention and to improve the accuracy of the magnetic recording medium.

Hereinbelow are now described the non-limiting methods for preparing the oriented polyester film, the composite polyester film and the magnetic recording medium of the present invention by way of illustration only.

(1) PREPARATION OF ORIENTED POLYESTER FILM

At first, the fine particles and at least one high aliphatic monocarboxylic acid or ester thereof are dispersed in the polyester. The dispersion may be carried out before, during or after polymerization reaction of the polyester, or in the same time with the melt-extrusion process of the polymer. Alternatively, a master which contains a high concentration of the fine particles and the high aliphatic monocarboxylic acid or ester thereof, either independently or together, in the polyester may also preferably diluted with the polyester.

The resulting polyester containing the specified fine particles and the specified high aliphatic monocarboxylic acid or ester thereof in the specified amounts is then melt-extruded in an appropriate extruder, cast into a sheet and stretched by a known way to orient. The stretching method has no limitation. An example of a uniaxial stretching method is a longitudinally uniaxial stretching (i.e. in the direction of extrusion only) by rolls or a transversally uniaxial stretching (i.e. in the direction at right angles to the direction of extrusion) by gripping with clips. An illustrative example of a biaxial stretching method, which is more desirable in the invention, includes simultaneous biaxial stretching, longitudinal-transverse successive biaxial stretching, longitudinal-transverse-longitudinal stretching, transverse-longitudinal stretching, doubled longitudinal-transverse stretching, doubled longitudinal-transverse-longitudinal stretching, longitudinal-transverse successive stretching followed by simultaneous biaxial stretching, and the like.

Thus oriented film is then heat-treated while allowing to relax, if necessary.

The film is then wound after subjecting to a known treatment with corona discharge, plasma or the like on at least one side of the film, if necessary.

(2) PREPARATION OF COMPOSITE POLYESTER FILM

The resin to be laminated on the oriented polyester film prepared in (1) is first synthesized by polymerization in the following manner, for example:

(a) A given amount of dimethyl dicarboxylate and a given amount of glycol are heated at 140°–240° C. in the presence of a known transesterification catalyst while removing methanol formed. After adding a conventional polymerization catalyst and an anti-bluing agent such as phosphorus compound, the mixture is then condensation-polymerized at 200°–290° C. under high vacuum of 0.01–50 mmHg while distilling ethylene glycol off.

(b) Dicarboxylic acid and glycol are directly reacted at 150°–270° C. under normal or high pressure to effect esterification while distilling off water formed. Then, diethylene glycol or triethylene glycol is added to effect condensation-polymerization.

The catalyst for transesterification may be any conventionally known catalyst such as compounds of Mg, Mn, Co, Ca, Zn, Sn, Ti, etc., which may also be used in a mixture. The catalyst for polymerization may be one or more compounds of Sb, Ge, Ti, etc.

The resulting resin may be laminated on the substrate oriented polyester film in the following manner.

The resin layer may be provided on only one side of the substrate film when an adhesive surface is desired on one side thereof only, for example magnetic tapes, or both sides thereof when adhesive surfaces are desired on both sides thereof, for example floppy disks, depending on their applications.

Any known lamination method may be used, for example, coating methods with aqueous solutions or emulsions or organic solutions of the resin, or lamination methods by hot melts or extrusions of the resin.

Particularly, the resin may be laminated on the substrate polyester film, (a) before stretching of the substrate, i.e. the resin is coated on an unoriented polyester film and then stretched together, (b) after uniaxially stretching of the polyester film, then stretched together in the direction at right angles to the initial orientation, or (c) after biaxially stretching of the polyester film.

In these cases, the polyester film substrate may be subjected, prior to the lamination, to a known surface treatment such as corona discharge on the surface to be laminated. Additionally, the process (a) may include the so-called co-extrusion, that is, the substrate polyester layer and the laminating resin layer may be co-extruded followed by stretching.

Among these processes, the method in which the substrate polyester layer and the laminating resin layer are co-extruded followed by biaxially stretching, or in which an aqueous solution of the resin is coated after uniaxially stretching the substrate polyester and stretched in the direction at right angles to the direction of the initial orientation, may be preferable from the view point of productivity.

The resulting composite polyester film may be heat-treated while allowing appropriate relaxation longitudinally and/or transversally.

The composite polyester film is then wound up after subjecting to a known treatment, if necessary, such as corona discharge, plasma and the like on at least one side thereof.

In the present invention, it is preferable to choose an appropriate combination of the conditions described above for the preparation so that the coefficient of static friction ($\mu_s$), which is a parameter of slipperiness between films (superimposed front-to-back), falls within the range of 0.3–0.8 and the coefficient of kinetic friction ($\mu_k$; Euler's equation), which is the slipperiness between film and metal (metallic friction member), namely a parameter of running property, falls within the range of 0.15–0.35, since this may result in more advantages of the composite polyester film.

(3) PREPARATION OF MAGNETIC RECORDING MEDIUM

A magnetic layer may be provided by the aforementioned manner on the oriented polyester film or on the resin layer laminated on the polyester film in the composite polyester film of the invention, resulting in, for example, a magnetic tape or disk.

The oriented polyester film of the present invention has the characteristics in that it contains the specific fine particles of the specific size and the specific high aliphatic monocarboxylic acid or ester thereof in the specific amounts, respectively, and due to such characteristics, the film effects the remarkable advantages, that is, it is excellent in both flatness and slipperiness and simultaneously it has excellent adhesive property to metals such as aluminium and to printing inks. Further, the oriented polyester film shows an excellency in both durability of slipperiness and abrasion resistance. The film also has a small surface roughness resulting in good non-opaqueness (i.e. low film haze). Moreover, it has good running property and is easily handled during the preparation processes of films and the winding and unwinding processes of slits due to suitable coefficients of friction. There is produced no side slip winding, scratch nor transcription of protrusions.

The composite polyester film of the present invention comprises the specific copolyester or copolyester ether resin layer laminated on at least one side of the oriented polyester film and therefore effects the following remarkable advantages;

(1) excellent in flatness, slipperiness and adhesion, simultaneously,
(2) excellent in both durability of slipperiness and abrasion resistance, and
(3) no decrease of adhesive property and no deterioration of slipperiness with time in a high humidity.

The reasons why these advantages are effected in the invention have not been exactly understood. It may, however, perhaps be considered as follows: the specific combination of the fine particles and the high aliphatic monocarboxylic acid or ester thereof contributes to the flatness and the slipperiness of the substrate surface of the oriented polyester film due to the synergistic effect on fine dispersion. The synergism on the oriented polyester film substrate remains during the preparation of films and/or after being wound up. The surface of the copolyester or copolyester ether resin layer still exhibits good anti-blocking property and slipperiness without any loss of adhesive property. Also, the synergistic effect may result in gold flatness of the surface of the easily adhesive layer.

Since the oriented polyester film and the composite polyester film of the present invention have such remarkable advantages, they are suitable for base films of magnetic recording media such as magnetic tapes and floppy disks, optics such as photograph, typing, X-ray film and microfilm, capacitors, graphic arts, packagings or the like, and particularly they are suitable for base films of magnetic recording media such as video tape recorders and magnetic recording disks, which have recently required portability and light weight, and for base films of thin film capacitors of vacuum deposition type.

Furthermore, the films of the invention are suitable, among magnetic recording media, in particular for metal tapes requiring higher density, tapes formed by vacuum deposition or sputtering, and disks. They are most suitable for vacuum-deposited tapes in which a magnetic layer is thin and good running property is highly required.

When used in a magnetic recording medium, much more excellent electromagnetic conversion and running properties can be obtained than a conventional magnetic recording medium, since the polyester film of the present invention is remarkably excellent in flatness, slipperiness and adhesive property.

The polyester film of the present invention, due to its good slipperiness, will not require any so-called "back-coating", which has hitherto been required for improving the running property of a magnetic tape.

Moreover, when used as a vacuum-deposited magnetic recording medium, there will not be required any so-called "top-coating", which has previously been required for preventing the vacuum-deposited surface from being scratched by a head.

When magnetic recording media are made from the polyester film having aforementioned advantages, they can be employed in various applications such as computers, audio, video and measuring devices as magnetic tapes, magnetic cards or magnetic disks. The magnetic recording medium of the present invention is particularly suitable for video.

MEASUREMENTS OF PROPERTIES AND CRITERIA OF EVALUATIONS

The methods for measurements of the properties and the criteria for evaluations in the present invention will hereinbelow be described.

(1) AVERAGE SIZE AND CONTENT OF FINE PARTICLES; AND CONTENT OF HIGH ALIPHATIC MONOCARBOXYLIC ACID OR ESTER THEREOF (1)-A. Average Size of Fine Particles $\phi$ ($\mu$m)

A sample specimen was observed by an optical or electron microscope, and the diameter of an equivalent sphere corresponding to the particle of which the amount was 50 % by weight of the total weight, normally known as "$D_{50}$", was used as an index of "average size" in the invention. The "equivalent sphere" is a sphere of which volume is the same as that of said particle.

(1)-B. Content of Fine Particles (Parts by Weight)

The content of the fine particles was determined by a method known as a "particle separation method". In this method, a sample is at first dissolved in o-chlorophenol and centrifuged. After centrifugation, the supernatant is removed by decantation to obtain separate particles. Polyester component might be incorporated into the separate particles due to insufficient separation. To remove such components, ochlorophenol of ordinary temperature is added to the separate particles, suspended substantially homogeneously and ultracentrifuged. These separation procedures are again repeated. The obtained separate particles is dryed at 120° C. under vacuum for 16 hours and weighed. The separate particles thus obtained by the aforementioned procedures may possibly contain both internal particles and inert particles. In such a case, the contents of the internal particles and the inert particles may independently by determined in the following way. At first, the separate particles are subjected to depolymerization in ethylene glycol to dissolve the internal particles alone. The remainder particles are centrifuged and the resulting separate particles are then dried and weighed. The amount thus determined was referred to as the content of the inert particles. The content of the internal particles was the difference between the amount of total separate particles previously determined and the amount of the inert particles (the inert particle content).

The structure of the fine particles, i.e. what were the fine particles, were identified by an atomic absorption analysis, an X-ray fluorescence analysis, a SEM-XMA method (ion microprobe method), an ESCA method (electron spectroscopy) or the like.

(1)-C. CONTENT OF HIGH ALIPHATIC MONOCARBOXYLIC ACID OR ESTER THEREOF (PARTS BY WEIGHT)

When the chemical structural formula of the high aliphatic monocarboxylic acid or ester thereof was known, its content was measured by NMR (nuclear magnetic resonance) analysis. Briefly, a sample was dissolved in a solvent $CDCl_3$ and analysed by 400 MHz $^1H$ NMR (JEOL GX-400; pulse FT spectrometer) and 22.5 MHz $^{13}C$ NMR (JEOL FT-900; pulse FT spectrometer). The obtained data were compared with those obtained from a sample without any high aliphatic monocarboxylic acid or ester thereof to determine the content.

When a chemical structural formula of a high aliphatic monocarboxylic acid or ester thereof was not known, SIMS (secondary ion mass spectrometry), MOLE (Laser-Raman microprobe), GC-MS (mass spectrometric gas chromatography), LIMA (Laser Induced Ion Mass Analyser), ESCA (Electron Spectroscopy), FT-IR (Fourier-transform Infrared Absorption) as well as above-described NMRs were used to identify the high aliphatic monocarboxylic acid or ester thereof and to determine its name, chemical structural formula, number of carbon atoms and content in the polyester.

(2) SURFACE ROUGHNESS $R_a$ ($\mu m$)

A surface roughness $R_a$ as a flatness parameter was measured according to JIS-B-0601 by a surface analyser (ET-10, manufactured by KOSAKA KENKYUJO, JAPAN).

(3) STATIC FRICTION COEFICIENT $\mu_s$

The coefficient of static friction, $\mu_s$, between the polyester films was measured by a slip-tester according to ASTM-D-1894B-63 and used as a slipperiness parameter of the polyester film.

(4) THICKNESS OF RESIN LAYER OF COPOLYESTER OR COPOLYESTER ETHER, d ($\mu m$)

A commercially available cellophane adhesive tape (manufactured by Nichiban Co., Ltd., Japan) was adhered to the resin layer and peeled off after dissolving and removing the resin layer along the edges of the cellophane tape by a solvent such as dimethylformamide. Then, the boundary between the surface protected by the cellophane tape and the surface removed by the solvent was examined by a surface analyser (ET-10, manufactured by KOSAKA KENKYUJO, JAPAN) to measure the thickness.

(5) THICKNESS OF MAGNETIC LAYER, t ($\mu m$)

An X-ray fluorescent fine thickness gauge (SFT-156, manufactured by DAINI SEIKOSHA, JAPAN) was used to measure the thickness of a magnetic layer.

(6) KINETIC FRICTION COEFFICIENT, $\mu_k$

A MCS tape running tester (TBT-300; manufactured by YOKOHAMA SYSTEM KENKYUJO, JAPAN) in which a specimen of polyester film slitted into ½ inch in width was run on a metallic friction member (SUS cylindrical guide roll of 5 mm in diameter; surface roughness of 0.2 s) at 25° C. under 65 % RH was used to measure the coefficient of kinetic friction between the film and the metallic member, $\mu_k$, which was used as a slipperiness parameter, i.e. a running parameter.

(7) ADHESION

(7)-A. Co-Ni Vacuum Deposition

Polyester films were allowed to stand either at 25° C. under 50% RH (normal temperature and humidity) for one day or at 50° C. under 90% RH (high temperature and humidity) for 30 days. The polyester films were subjected to vacuum deposition using a bell jar-type high vacuum deposition apparatus (EBH-6; manufactured by NIHON SHINKU GIJUTSU KK, JAPAN) at approximately $1 \times 10^{-5}$ mmHg to form a Co-Ni coating of approximately 0.1 $\mu m$ in thickness, and allowed to stand at 25° C. under 50% RH for one day. Thereafter, a cellophane adhesive tape commercialized by Nichiban Co., Ltd., Japan was adhered on the Co-Ni coating and peeled off in the vertical direction to the film surface to measure the area (S) on which the deposited Co-Ni remained.

The criteria of evaluation are as follows:

| Index: 1; | S < 50% |
|---|---|
| 2; | 50% ≦ S < 75% |
| 3; | 75% ≦ S < 90% |
| 4; | 90% ≦ S < 100% |
| 5; | 100% = S |

The adhesion showing indices of 3-5 was evaluated to be satisfactory for the practical use.

(7)-B. Adhesion of Magnetic Coating

Similarly to (7)-A, a magnetic coating was coated on the polyester films after allowing to stand either normal or high temperature and humidity conditions. After allowing to stand at 25° C. under 50% RH for one day, a cellophane adhesive tape (Nichiban Co., Ltd., Japan) was adhered on the coated surface and peeled off vertically to the film surface. The area on which the magnetic coating remained was measured and evaluated according to the criteria shown above.

(7)-C. Deposition of Aluminium

Aluminium was deposited on a polyester film by using a bell jar-type high vacuum deposition apparatus (EBH-6; manufactured by NIHON SHINKU GIJUTSU KK, JAPAN) at approximately $1 \times 10^{-5}$ mmHg in a thickness of approximately 100 nm. A cellophane adhesive tape of Nichiban Co., Ltd., Japan was adhered on the Al-deposited surface and peeled off in the direction vertical to the film surface.

The area on which deposited Al remained was measured and evaluated according to the criteria shown in (7)-A above.

(7)-D. Adhesion of Printing Ink

A printing ink for cellophane ("CC-ST", white; manufactured by Toyo Ink Co., Ltd., Japan) was coated on a film of polyester by using a metering bar in a solid content of approximately 3 kg/$m^2$, dried by hot air at 60° C. for one minute and subjected to the test of (7)-C above to evaluate according to the criteria shown in (7)-A above.

(8) DURABILITY OF SLIPPERINESS

A tape of polyester film was five hundred times repeatedly run with contact on a metallic (SUS) stationary guide (5 mm in diameter; 0.2 s in surface roughness), and the coefficient of static friction, $\mu_s$, was measured according to the procedures of (3) above.

If the difference between before and after the running test was 0.1 or less, the durability was evaluated as good and the difference of more than 0.1 as poor.

(9) ABRASION RESISTANCE

A tape of polyester film was five hundred times repeatedly run with the surface thereof being in contact with a metallic (SUS) stationary guide (5 mm in diameter; 0.2 s in surface roughness), and scratches on the film were observed to evaluate the abrasion resistance according to the following criteria, based on the number of the scratches:
Very small as "excellent"
Small as "good"
Large as "poor".

(10) ANTI-BLOCKING PROPERTY

Samples of polyester film (3 cm×8 cm) were cut out. Two samples were superimposed front-to-back, and a load of 2 kg was placed on around the center of the samples. After allowing to stand at 50° C. under 83% RH for two days, the blocking shear strength in units of $g/12$ $cm^2$ was measured by a Schopper tensile tester. The anti-blocking property of the film was evaluated as good when the shear strength was less than 300 $g/12$ $cm^2$ and poor when 300 $g/12$ $cm^2$ or more.

(11) FILM HAZE

Haze was measured according to ASTM-D-1003-52. transparency was good when haze was 3.5% or less for a film of 15 μm thickness.

(12) RUNNING PROPERTY OF MAGNETIC TAPE

A sample magnetic tape, on which a signal of 7000 Hz had been recorded, was loaded in a tape recorder and run at a speed of 10 cm/sec with alternate stops and starts. Such test was continued until 100 hours of a running time while monitoring tape outputs. If the tape ran smoothly during the test period without sticking on the guide rollers, and if the drop in outputs was less than 20 dB after 100 hour running, the running property of the film was evaluated as "good", and otherwise as "poor".

(13) ELECTROMAGNETIC PROPERTIES

When a sample magnetic recording medium was played back and an output signal was observed on a screen, a sample giving a strong signal with flat waveform was evaluated to be "good", and a sample giving a weak or deformed signal to be "poor".

EXAMPLES

The present invention will be described with reference to the following non-limitative examples.

EXAMPLE 1

Transesterification was carried out in a conventional manner using 100 parts by weight of dimethyl terephthalate, 62 parts by weight of ethylene glycol and 0.06 parts by weight of calcium acetate as a catalyst. To the resulting product were added 0.04 parts by weight of antimony trioxide, 0.07 parts by weight of lithium acetate and 0.04 parts by weight of calcium acetate. Subsequently, 0.02 parts by weight of phosphorous acid and 0.10 parts by weight of trimethyl phosphate were added and condensation-polymerization was carried out to obtain a polyester, which had intrinsic viscosity of 0.618 and contained 0.35 parts by weight of internal particles per 100 parts by weight of the polyester, hereinafter referred to as "Polyester A". The internal particles contained 1.2 parts by weight of calcium element, 1.9 parts by weight of lithium element and 4.9 parts by weight of phosphorus element.

Hundred parts by weight of terephthalic acid and 43 parts by weight of ethylene glycol were kneaded to prepare a slurry. The slurry was continuously added at a constant speed to a reaction product of 50 parts by weight of terephthalic acid and 21.5 parts by weight of ethylene glycol, which had been stored at 245° C. in a reactor. Esterification reaction was carried out at 245° C. under normal pressure while continuously distilling off water formed through a rectifying column out of the system. The slurry was fed in 3 hours and a half while the reaction was completed after 4 hours. The esterified product corresponding to 100 parts by weight of terephthalic acid was transferred from the reactor to a polymerization reactor, and a slurry of 0.045 parts by weight of phosphoric acid, 0.023 parts by weight of antimony trioxide and 23 parts by weight of calcium carbonate in ethylene glycol was added. The polymer obtained by a conventional, polycondensation reaction had intrinsic viscosity of 0.615 and contained 2 parts by weight of calcium carbonate and no internal particles defined in the invention, the polymer being hereinafter referred to as "Polyester B".

According to the above-mentioned method for Polyester B, there was obtained a polymer without internal particles having intrinsic viscosity of 0.62, hereinafter referred to as "Polyester C".

A polycondensation reaction was carried out in a similar method as for Polyester B but without adding internal particles. After reaction, 2.3 parts by weight of carnauba wax was added and kneaded for approximately 10 minutes to produce a polymer having intrinsic viscosity of 0.610, hereinafter referred to as "Polyester D".

The Polyesters A, B, C and D were blended and dried at 170° C. under reduced pressure for 2 hours. The resulting polymer composition comprised 100 parts by weight of polyester, 0.17 parts by weight of internal particles, 0.1 part by weight of calcium carbonate and 0.05 parts by weight of carnauba wax.

The polymer composition was melt-extruded at 285° C. and cast on a cooling drum at 60° C. to obtain an unoriented sheet which was in turn subjected to a conventional successive biaxial stretching. In this streching process, the sheet was at first stretched longitudinally between a pair of rolls having different peripheral velocities at 90° C. with a ratio of 3.3 times larger than the original length. The thus uniaxially stretched sheet had refractive indices of 1.64 in longitudinal and 1.54 in transverse, and consequently the birefringence in plane Δn was 0.10. The sheet was successively fed to a tenter, wherein the sheet was transversally stretched at 95° C. with a ratio of 3.5 times larger than the original width while gripping both ends with clips and heat-treated at 218° C. for 5 seconds while relaxing by 5% in transversal direction. The biaxially oriented film from the tenter was subjected to corona discharge treatment on both sides with energy of 50 W.min/$m^2$ and wound up to obtain a biaxially oriented film of polyethylene terephthalate with a thickness of 15 μm. The film could easily be wound up extremely well. Refractive indices in longitudinal, transversal and thickness directions of this film were 1.63, 1.66 and 1.50 (P), respectively. The refractive index Q was 1.57. Consequently, the birefringence in plane Δn was 0.03, the sum of in-plane refractive indices was 3.29 and the ratio of refractive indices in the thickness direction was 0.95.

The results of measurements of properties and evaluations of these films are shown in Table 1, where the compositions represent those of the resulting films, not diameters and/or amounts of the components to be added. The average size of the internal particles was 1.0 μm. The properties of the films were the same in both surfaces. From Table 1, it is apparent that the film of this example was excellent in all properties, i.e. flatness ($R_a$), slipperiness ($\mu s$), transparency (haze), adhesion (A1 adhesion and printing ink adhesion), running property ($\mu_k$), durability of slipperiness and abrasion resistance.

A magnetic tape was obtained by coating a magnetic coating composition on one surface of the film in the following manner. The coating composition comprised 300 parts by weight of ferromagnetic alloy powder (Fe-Co), 25 parts by weight of zinc powder (average size of 2 μm), 30 parts by weight of cellulose acetate butylate, 25 parts by weight of epoxy resin, 4 parts by weight of silicone oil, 5 parts by weight of lecithin, 200 parts by weight of toluene (as solvent), 200 parts by weight of methyl ethyl ketone (as solvent) and 100 parts by weight of ethyl acetate (as solvent). The composition was placed into a ball mill and thoroughly kneaded. Into the ball mill, 180 parts by weight of polyisocyanate compound (Desmodur L-75) was further added and mixed with stirring for 30 minutes. The resulting composition was coated on one surface of the polyethylene terephthalate film while applying a magnetic field thereto so that the thickness after drying was to be 4 μm, and dried. Thereafter, the film was subjected to curing and calendering and then slitted into tapes of ½ inch in width for video tapes.

The properties of the tapes were then evaluated and the results are also shown in Table 1.

As shown in Table 1, the magnetic tape using the film of this example is excellent in all properties, i.e. adhesion of magnetic layer, running property of the magnetic tape and electromagnetic conversion property.

EXAMPLES 2–8 AND COMPARATIVE EXAMPLES 1–5

In accordance with the method for Polyester B of Example 1, a polyester containing 1.0 part by weight of dry silica ($SiO_2$, AEROSIL R-972; NIHON AEROSIL KK, JAPAN) instead of calcium carbonate per 100 parts by weight of polyethylene terephthalate was obtained, hereinafter referred to as "Polyester E".

A polymer containing 2.3 parts by weight of montanic acid was obtained in accordance with the method for Polyester D of Example 1, hereinafter referred to as "Polyester F".

A polymer containing 2.3 parts by weight of insect wax was obtained in accordance with the method for Polyester D of Example 1, hereinafter referred to as "Polyester G".

The Polyesters A, C, D, E, F and/or G were chosen each in an appropriate amount and blended. From these blends, there were obtained biaxially oriented films of polyethylene terephthalate of each 15 μm in thickness in the similar manner to Example 1.

The properties of these films are together shown in Table 1. The films of Examples 2–8, which are within the scope of the present invention, were excellent in all properties, i.e. flatness, slipperiness, transparency (haze), adhesion (A1 adhesion and printing ink adhesion), running property ($\mu_k$), durability of slipperiness and abrasion resistance.

On the other hand, each film of Comparative Examples 1–5, which lacked in any one or more features of the invention defined in claims, was defective in some of the properties.

Then, a magnetic layer of Co-Ni alloy (Co/Ni=80/20, by weight) was coated in a thickness of 100 nm by vacuum deposition on one surface of each film of Examples 2–8 and Comparative Examples 1–5, and each coated film was slitted into a coated magnetic tape of ½ inch in width. The magnetic tapes of Examples 2–8 were excellent in all properties, i.e. adhesion of magnetic layer to film, running property of the magnetic tape and electromagnetic property, while the magnetic tapes of Comparative Examples 1–5, each of which lacked in any one or more features of the invention defined in claims, were defective each in any one or more properties of the magnetic tapes.

TABLE 1

| | RESULTS OF MEASUREMENTS AND EVALUATION (1) | | | | | | | | |
|---|---|---|---|---|---|---|---|---|---|
| | Compositions* | | | | | | Properties | | |
| | Fine particles | | | | | | Film | | |
| | | Inert Particles | | | High Aliphatic | | | | |
| Example No. | Internal Particles Amount | Kind | Average Size (μm) | Amount | Monocarboxylic Acid or Ester Kind | Amount | Flatness $R_a$ (μm) | Slipperiness $\mu_s$ | Haze (%) |
| 1 | 0.17 | calcium carbonate | 1.5 | 0.10 | carnauba wax | 0.05 | 0.017 | 0.33 | 3.2 |
| 2 | 0.15 | dry silica | 0.3 | 0.15 | carnauba wax | 0.11 | 0.013 | 0.48 | 2.6 |
| 3 | 0.15 | dry silica | 0.3 | 0.15 | carnauba wax | 0.30 | 0.014 | 0.40 | 2.3 |
| 4 | 0.15 | dry silica | 0.3 | 0.15 | carnauba wax | 0.09 | 0.014 | 0.49 | 2.5 |
| 5 | none | dry silica | 0.3 | 0.50 | carnauba wax | 0.15 | 0.019 | 0.31 | 3.0 |
| 6 | 0.35 | none | none | none | carnauba wax | 0.20 | 0.016 | 0.40 | 2.3 |
| 7 | 0.17 | dry silica | 0.3 | 0.15 | montanic acid | 0.15 | 0.024 | 0.45 | 2.2 |
| 8 | 0.17 | dry | 0.3 | 0.15 | insect | 0.15 | 0.014 | 0.44 | 2.2 |

TABLE 1-continued
RESULTS OF MEASUREMENTS AND EVALUATION (1)

| | silica | | | wax | | | | |
|---|---|---|---|---|---|---|---|---|
| | | | Properties | | | | | |
| | | | Film | | | | Magnetic Tape | |
| | Adhesion | | Running | Durability of | | Adhesion of | | Electro-magnetic |
| Example No. | Al Deposition | Printing Ink | Property $\mu_k$ | Slipperiness | Abrasion Resistance | Magnetic Coating | Running Property | Conversion |
| 1 | 3 | 4 | 0.23 | good | good | 4 | good | good |
| 2 | 4 | 4 | 0.21 | good | excellent | 4 | good | excellent |
| 3 | 4 | 4 | 0.23 | good | excellent | 4 | good | excellent |
| 4 | 3 | 3 | 0.24 | good | excellent | 3 | good | good |
| 5 | 4 | 4 | 0.22 | good | excellent | 4 | good | excellent |
| 6 | 4 | 4 | 0.22 | good | excellent | 4 | good | excellent |
| 7 | 3 | 4 | 0.22 | good | good | 4 | good | good |
| 8 | 4 | 4 | 0.22 | good | good | 4 | good | excellent |

*parts by weight per 100 parts by weight of polyester

TABLE 1
RESULTS OF MEASUREMENTS AND EVALUATIONS (2)

| | Compositions* | | | | | | Properties | | |
|---|---|---|---|---|---|---|---|---|---|
| Comparative Example No. | Fine Particles | | | | High Aliphatic Monocarboxylic Acid or Ester | | Film | | |
| | Internal Particles Amount | Inert Particles | | | | | Flatness $R_a$ ($\mu$m) | Slipperyness $\mu_s$ | Haze (%) |
| | | Kind | Average Size ($\mu$m) | Amount | Kind | Amount | | | |
| 1 | 0.35 | none | none | none | none | none | 0.040 | 0.87 | 2.5 |
| 2 | none | none | none | none | carnauba wax | 0.2 | 0.007 | 1.65 | 2.5 |
| 3 | 0.1 | dry silica | 0.3 | 0.1 | carnauba wax | 2.5 | 0.017 | 1.10 | 3.8 |
| 4 | 0.10 | dry silica | 0.3 | 0.30 | carnauba wax | 3.0 | 0.015 | 0.30 | 4.1 |
| 5 | 0.20 | none | none | none | carnauba wax | 0.004 | 0.029 | 0.86 | 2.0 |

| | Properties | | | | | | | |
|---|---|---|---|---|---|---|---|---|
| Comparative Example No. | Film | | | | | Magnetic Tape | | |
| | Adhesion | | Running Property $\mu_k$ | Durability of Slipperiness | Abrasion Resistance | Adhesion of Magnetic Coating | Running Property | Electromagnetic Conversion |
| | Al Deposition | Printing Ink | | | | | | |
| 1 | 3 | 4 | 0.27 | good | excellent | 4 | good | poor |
| 2 | 2 | 2 | 0.41 | good | good | 2 | poor | poor |
| 3 | 3 | 4 | 0.37 | good | poor | 4 | poor | good |
| 4 | 1 | 1 | 0.21 | good | good | 2 | poor | good |
| 5 | 3 | 4 | 0.29 | good | good | 4 | poor | poor |

*Parts by weight per 100 parts by weight of polyester

EXAMPLE 9 AND COMPARATIVE EXAMPLE 6

A composition shown in Table 2 was obtained by blending Polyesters A, B, C and D prepared in the same manner as Example 1 each in an appropriate amount. After drying at 170° C. for 2 hours, the composition was melt-extruded at 285° C. and cast on a cooling drum at 60° C. The resulting unoriented sheet was longitudinally stretched at 90° C. between a pair of rolls having each different peripheral velocity with a stretching ratio of 3.3 times larger than the original length. The resulting uniaxially oriented film had the refractive indices of 1.64 in longitudinal and 1.54 in transverse and the birefringence in plane Δn of 0.10 (Example 9).

Similarly, a composition of Polyesters C and D was made into a film (Comparative Example 6).

On the other hand, 165 parts of dimethyl terephthalate, 44.5 parts of dimethyl 5-sodium sulphoisophthalate, 124 parts of ethylene glycol, 0.106 parts of manganese acetate tetrahydrate and 0.07 parts of calcium acetate dihydrate were mixed and methanol was distilled off at 140°–220° C. to effect transesterification reaction. To the reaction product mixture, 0.09 parts of trimethyl phosphate, 7.2 parts of diethylene glycol and 0.06 parts of antimony trioxide were added, and the temperature of the mixture was raised from 240° C. to 280° C. in one hour and thirty minutes while simultaneously decreasing the pressure gradually from normal to 0.5 mmHg so that ethylene glycol formed was removed out of the system. The mixture was maintained for further 40 minutes at this state to obtain a copolyester having intrinsic viscosity of 0.57.

An analysis of the copolymerized components of the copolyester showed that 17% by mole of diethylene glycol including the biproducts formed during the reaction was contained in the total glycol component and that 14% by mole of 5-sodium sulphoisophthalic acid was contained in the dicarboxylic acid component.

The copolyester was dissolved into hot water of 85° C. to be an aqueous 5% by weight solution.

Corona discharge with 170 W.min./m² was applied to one surface of the previously obtained uniaxially oriented film, and on the same surface was coated the aqueous 5% by weight solution by a metering bar. The coated film was placed in a tenter, and gripped with clips at both ends, stretched in the transversal direction at 95° C. with a stretching ratio of 3.5 times larger than the original width, and treated at 215° C. for 5 seconds to completely remove water while relaxing transversally by 5%. The thus treated film was wound up at the exit of the tenter with good workability.

The thickness of the resulting composite polyester film was 15 μm in total and the thickness of the resin layer of copolyester ether was 0.05 μm. The substrate polyester film of the composite polyester film had the refractive indices of 1.63 in longitudinal, 1.66 in transverse and 1.50 in thickness direction (P). The refractive index (Q) was 1.57. Consequently, the birefringence in Δn was 0.03, the sum of in-plane refractive indices was 3.29 and the ratio of refractive indices in the thickness direction (P/Q) was 0.95.

Then, a magnetic coating composition was coated on the surface of the copolyester resin layer of each composite polyester films of Example 9 and Comparative Example 6 in the following manner to obtain a magnetic tape. The coating composition comprised 300 parts by weight of ferromagnetic alloy powder (Fe-Co), 25 parts by weight of zinc powder (average size of 2 μm), 30 parts by weight of cellulose acetate butylate, 25 parts by weight of epoxy resin, 4 parts by weight of silicone oil, 5 parts of lecithin, 200 parts by weight of toluene (as solvent), 200 parts by weight of methyl ethyl ketone (as solvent) and 100 parts by weight of ethyl acetate (as solvent). The composition was placed into a ball mill and thoroughly kneaded. To the resulting mixture, 180 parts by weight of polyisocyanate compound (Desmodur L-75) was added and mixed with stirring for 30 minutes. The resulting coating composition was coated on the given surface while applying a magnetic field so that the thickness after being dried was to be 4 μm, and dried. Thereafter, the film was subjected to curing and calendering and then slitted into video tapes with ½ inch wide.

The evaluation results of the properties of the composite polyester films and the magnetic tapes are shown in Table 2.

As seen from the results in Table 2, the composite polyester film of Example 9 was excellent in flatness ($R_a$), slipperiness ($\mu_s$ and $\mu_k$) and adhesion (after standing under both normal and high temperature and humidity conditions), and good in durability of slipperiness, abrasion resistance, anti-blocking property and transparency (haze). Further, the magnetic tape obtained from the composite polyester film of Example 9 was excellent in both running and electromagnetic conversion properties.

On the other hand, the composite polyester film of Comparative Example 6 containing no internal particle nor inert particle but the high aliphatic acid wax alone resulted in poor slipperiness, adhesion after standing with time and anti-blocking property, although good flatness was obtained. Furthermore, the magnetic tape had poor running property.

For comparison, a film was prepared from a substrate oriented polyester film containing 0.17 parts by weight of the internal particles only. The resulting film had $R_a$ of 0.040 μm in "A" surface and 0.028 μm in "B" surface and μs of 1.10 and thus was poor in both flatness and slipperiness. The meanings of "A" and "B" should be referred to NOTE of Table 3 shown below.

TABLE 2

| | RESULTS OF MEASUREMENTS AND EVALUATIONS | | | | | | | |
|---|---|---|---|---|---|---|---|---|
| | Compositions of substrate oriented polyester film (parts by weight per 100 parts by weight of polyester) | | | | | | Properties of Composite Polyester Film | |
| | Fine Particles | | | | High Aliphatic Acid Wax | | Flatness $R_a$ (μm) Upper: "A" Lower: "B" | Slipperiness |
| | Internal Particles Amount | Inert Particles | | | | | | $\mu_k$ Upper: A |
| | | Kind | Average Size (μm) | Amount | Kind | Amount | | $\mu_s$ Lower: B |
| Example 9 | 0.26 | calcium carbonate | 1.8 | 0.10 | carnauba wax | 0.30 | 0.019 0.007 | 0.31 0.22 0.31 |
| Comparative Example 6 | none | none | none | none | carnauba wax | 0.30 | 0.007 0.005 | 1.40 0.38 >0.5 |

| | Properties of Composite Polyester Film | | | | | Magnetic tape | |
|---|---|---|---|---|---|---|---|
| | | | | Adhesion after standing under | | | Electromagnetic Conversion |
| | Durability of Slipperiness | Abrasion Resistance | Antiblocking Property | Haze (%) | norm. temp. humid | high temp. humid | Running Property |
| Example 9 | good | excellent | good | 3.0 | 4 | 4 | good good |
| Comparative Example 6 | good | poor | poor | 0.5 | 4 | 1 | good good |

EXAMPLE 10

A magnetic layer of Co-Ni alloy was coated on the surface of the copolyester resin layer of the composite polyester film of Example 9 in a thickness of 0.1 μm by vacuum deposition, and the coated film was slitted into magnetic tapes of ½ inch wide, which showed good running and electromagnetic conversion properties.

EXAMPLES 11, 12 AND 13 AND COMPARATIVE EXAMPLE 7

Composite polyester films of each 15 μm in total thickness were prepared from the polyester film having the same composition as Example 9 as a substrate and copolyesters shown in Table 3 as laminated resins by the stretching and the coating methods similar to those of Example 9. The thickness of the copolyester resin layer was 0.05 μm in all Examples. A magnetic layer was coated on the surface of the copolyester resin layer of each composite polyester film while applying a magnetic field to prepare a magnetic tape.

The evaluated results of the properties of these composite polyester films and the magnetic tapes are shown in Table 3. As shown in Table 3, Example 11 corresponds to one within the preferable range of the present invention, and the composite film was excellent in flatness, slipperiness and adhesion and the magnetic tape was excellent in both running and electromagnetic conversion properties. Furthermore, Examples 12 and 13 are within the scope of the invention and the properties were generally good although somewhat inferior to Example 11. On the other hand, the adhesion and slipperiness of the film and the properties of the magnetic tape of Comparative Example 7 were deteriorated since isophthalic acid, which is outside the scope of the present invention, was used instead of 5-sodium sulphoisophthalic acid.

EXAMPLES 14 AND 15

There were utilized the composition of Example 9 as a composition of a substrate polyester, and copolyesters shown in Table 3 as laminating resins. The polyester and the copolyester were melt at 290° C. and co-extruded by using two extruders through a single orifice to form a composite unoriented sheet which was subjected to longitudinal stretching, transversal stretching and heat-treatment according to the conditions of Example 9 and wound up. The resulting film had a total thickness of 15 μm with a copolyester layer of 0.1 μm in thickness. Co-Ni was then coated on the surface of the copolyester layer by the vacuum deposition of Example 10 to form a magnetic tape. The properties of the composite polyester films and the magnetic tapes are shown in Table 3. Example 14 corresponded to one within the preferable scope of the present invention and showed good properties.

On the other hand, the amount of dicarboxylic acid of the copolyester in Example 15 was outside the preferable range of the invention, although within the broadest scope of the invention, resulting in somewhat poorer adhesion than Example 14.

EXAMPLES 16 AND 17

According to the method of Example 9, there were obtained composite polyester films of each 15 μm in total thickness with a copolyester resin layer of 0.0005 μm (Example 16) or 2.5 μm in thickness (Example 17), and magnetic tapes were then prepared. The properties of these composite polyester films and the magnetic tapes are shown in Table 3. As seen from Table 3, Example 16 where the thickness of the copolyester resin layer was less than Example 9 (where the thickness of the copolyester resin layer was within the most preferable range of the present invention) gave the properties which were generally good but somewhat poorer adhesion than Example 9. On the other hand, Example 17 where the thicker layer was used showed the properties which were generally good but somewhat poorer slipperiness than Example 9.

EXAMPLE 18

A composite polyester film of 15 μm in total thickness was prepared by laminating a copolyester ether resin layer shown in Table 3 of 0.1 μm in thickness, which comprised 5% by weight of polyethylene glycol (molecular weight of 15,000) as polyether component, on one surface of the substrate oriented polyester film. The composite polyester film showed excellent flatness, slipperiness and adhesion, as shown in Table 3. On the other hand, a magnetic tape was prepared by coating a magnetic layer on the surface of the laminated copolyester ether resin layer of the composite polyester film by vacuum deposition of Example 10. The magnetic tape showed excellent running and electromagnetic conversion properties, as shown in Table 3.

TABLE 3

RESULTS OF MEASUREMENTS AND EVALUATIONS

| | Compositions of Copolyester or Copolyester Ether Resin | | | | | | Properties of Composite Polyester Film | | | | |
|---|---|---|---|---|---|---|---|---|---|---|---|
| | Polyester Components | | | | | Polyether | | | | | |
| | Dicarboxylic Acid (mole %) | | | Glycol (mole %) | | Component (wt %) | Flatness $R_a$ (μm) | | | Slipperiness $\mu_k$ | |
| | TPA | SI | IPA | EG | DEG | PEG | "A" | "B" | $\mu_s$ | "A" | "B" |
| Example 11 | 87 | 13 | none | 97 | 3 | none | 0.018 | 0.006 | 0.38 | 0.23 | 0.32 |
| Comparative Example 7 | 87 | none | 13 | 97 | 3 | none | 0.018 | 0.006 | 1.14 | 0.42 | 0.48 |
| Example 12 | 91 | 9 | none | 30 | 70 | none | 0.024 | 0.018 | 0.78 | 0.28 | 0.34 |
| Example 13 | 96 | 4 | none | 99.8 | 0.2 | none | 0.025 | 0.019 | 0.65 | 0.28 | 0.35 |
| Example 14 | 99 | 1 | none | 98 | 2 | none | 0.018 | 0.009 | 0.51 | 0.22 | 0.26 |
| Example 15 | 99.5 | 0.5 | none | 98 | 2 | none | 0.018 | 0.010 | 0.51 | 0.22 | 0.26 |
| Example 16 | 86 | 14 | none | 83 | 17 | none | 0.019 | 0.008 | 0.39 | 0.24 | 0.34 |
| Example 17 | 86 | 14 | none | 83 | 17 | none | 0.018 | 0.007 | 0.77 | 0.34 | 0.34 |
| Example 18 | 86 | 14 | none | 83 | 17 | 5 | 0.018 | 0.007 | 0.39 | 0.24 | 0.32 |

| | Properties of Composite Polyester Film | | | | Properties of Magnetic Tape | |
|---|---|---|---|---|---|---|
| | Adhesion after standing under | | Anti- blocking Property | Trans- parency | Running Property | Electromagnetic Conversion Property |
| | norm. temp. humid | high temp. humid | | | | |
| Example 11 | 4 | 4 | good | good | good | good |
| Comparative Example 7 | 2 | 2 | good | good | poor | poor |
| Example 12 | 4 | 4 | good | good | good | good |
| Example 13 | 3 | 3 | good | good | good | good |
| Example 14 | 4 | 4 | good | good | good | good |
| Example 15 | 3 | 3 | good | good | good | good |
| Example 16 | 3 | 3 | good | good | good | good |
| Example 17 | 4 | 2 | good | good | good | good |

TABLE 3-continued

RESULTS OF MEASUREMENTS AND EVALUATIONS

| Example 18 | 4 | 4 | good | good | good | good |
|---|---|---|---|---|---|---|

NOTE:
TPA = terephthalic acid, SI = 5-sodium sulphoisophthalic acid, IPA = isophthalic acid, EG = ethylene glycol, DEG = diethylene glycol, PEG = polyethylene glycol.
"A" represents the surface of the substrate oriented polyester film and "B" represents the surface of the resin layer of copolyester or copolyester ether.

EXAMPLE 19

A pellet of polymer comprising 100 parts by weight of polyethylene $\alpha,\beta$-bis(2-chlorophenoxy)ethane-4,4'-dicarboxylate (namely, polyester), 0.15 parts by weight of myricyl cerotate and 0.15 parts by weight of dry silica, that is, containing no internal particles, was dried at 180° C. under vacuum for 3 hours and then fed to an extruder to form an unoriented film of approximately 100 μm in thickness. The unoriented film was stretched at 115° C. in the longitudinal direction with a ratio of 4.0 times larger than the original length and then at 150° C. in the transverse direction with a ratio of 4.5 times larger than the original width, and immediately after the stretching procedures, the biaxially oriented film was treated at 220° C. for 10 seconds while maintaining the length and the width to obtain a biaxially oriented film of 6 μm in thickness. The film had the refractive index in the thickness direction of 1.54, the density of 1.47 g/cm$^3$ and the contents of myricyl cerotate and dry silica of 0.13 parts by weight per 100 parts by weight of polyester in both components. The biaxially oriented film had the following properties: $R_a$=0.010 μm, $\mu_s$=0.40, haze of 2.0%, Al deposition index of 4, printing ink adhesion index of 4, $\mu_k$=0.21, good durability of slipperiness, and good abrasion resistance.

Furthermore, a magnetic layer of Co-Ni alloy was coated on one surface of the film according to the method of Examples 2-8 to prepare a magnetic tape, of which properties were then measured. The results were as follows: adhesion index of magnetic coating of 4, good running property of the magnetic tape, and good electromagnetic conversion property.

Although the film of this Example had a thin thickness as small as 6 μm, the running, slitting and magnetic properties of the magnetic tape obtained therefrom were all good.

What is claimed is:
1. A magnetic recording medium comprising:
   (1) an oriented polyester film containing, per 100 parts by weight of a polyester,
      (A) 0.005-1 part by weight of fine particles having an average size of 0.05-3 μm, and
      (B) 0.005-0.5 parts by weight of at least one compound selected from the group consisting of higher aliphatic monocarboxylic acids having 10-33 carbon atoms and esters thereof; and
   (2) a magnetic layer laminated on at least one side of the oriented polyester film.
2. The magnetic recording medium of claim 1, in which the oriented polyester film has a surface roughness (Ra) of 0.001-0.025 μm and a coefficient of static friction ($\mu_s$) of 0.3-1.0.
3. The magnetic recording medium of claim, in which the oriented polyester film has a surface roughness ($R_a$) of 0.001-0.010 μm and a coefficient of static friction ($\mu_s$) of 0.4-0.9.
4. The magnetic recording medium of claim 1, in which the polyester consists of polyethylene terephthalate.
5. The magnetic recording medium of claim 1, in which the polyester consists of polyethylene $\alpha,\beta$-bis(2-chlorophenoxy) ethane-4,4'-dicarboxylate.
6. The magnetic recording medium of claim 1, in which the fine particles consist of oxides or inorganic salts which contain an element of the Group II, III or IV in the periodic table.
7. The magnetic recording medium of claim 1, in which the fine particles consist of fluorinated polymers.
8. The magnetic recording medium of claim 1, in which the average size of the fine particles is in the range of 0.1-2 μm.
9. The magnetic recording medium of claim 1, which the oriented polyester film contains 0.01-0.5 parts by weight of the fine particles.
10. The magnetic recording medium of claim 1, in which the higher aliphatic monocarboxylic acid has 20-32 carbon atoms.
11. The magnetic recording medium of claim 10, in which the higher aliphatic acid component consists of at least one compound selected from the group consisting of melissic acid, cerotic acid, erucic acid, montanic acid, ceryl montanate myricyl cerotate, ceryl cerotate, carnauba wax, insect wax, behenic acid and stearyl behenate.
12. The magnetic recording medium of claim 1, in which the oriented polyester film contains more than 0.1 parts by weight and not more than 0.5 parts by weight of the higher aliphatic acid component.
13. The magnetic recording medium of claim 1, in which the oriented polyester film is biaxially oriented, the birefringence in plane thereof being in the range of 0-0.1, the sum of in-plane refractive indices being in the range of 3.2-3.42 and the ratio of refractive indices in the thickness direction being in the range of 0.935-0.980.
14. The magnetic recording medium of claim 1, in which the oriented polyester film has a thickness of 4-75 μm.
15. The magnetic recording medium of claim 1, in which the magnetic layer has a thickness of 0.01-1.0 μm.
16. The magnetic recording medium of claim 1, in which the magnetic layer comprises $\gamma$-$Fe_2O_3$, $\gamma$-$Fe_2O_3$, doped with Co, $CrO_2$, Fe, Co, Ni or an alloy thereof or a mixture thereof.
17. The magnetic recording medium of claim 15, in which the magnetic layer is formed by a method selected from the group consisting of vacuum deposition, sputtering and ion plating.
18. The magnetic recording medium of claim 1, which is a magnetic recording tape or a magnetic recording disk.
19. The magnetic recording medium of claim 1, which is a videotape.

20. The magnetic recording medium of claim 1, which is a floppy disk.

21. The magnetic recording medium of claim 1, which is an audiotape.

22. The magnetic recording medium of claim 1, which is a tape for a computer.

23. An oriented polyester film containing, per 100 parts by weight of polyethylene α, β-bis(2-chlorophenoxy) ethane-4,4'-dicarboxylate,
  (A) 0.005–2 parts by weight of fine particles having average size of 0.05–3 μm; and
  (B) 0.005–2 parts by weight of at least one compound selected from the group consisting of high aliphatic monocarboxylic acids having 10–33 carbon atoms and esters thereof.

24. An oriented polyester film containing, per 100 parts by weight of a polyester,
  (A) 0.005–2 parts by weight of fluorinated polymer fine particles having average size of 0.05–3 μm, and
  (B) 0.005–2 parts by weight of at least one compound selected from the group consisting of high aliphatic monocarboxylic acids having 10–33 carbon atoms and esters thereof.

25. A composite polyester film comprising;
  (1) an oriented polyester film containing, per 100 parts by weight of a polyester,
    (A) 0.005–2 parts by weight of fine particles having average size of 0.05–3 μm, and
    (B) 0.005–2 parts by weight of at least one compound selected from the group consisting of high aliphatic monocarboxylic acids having 10–33 carbon atoms and esters thereof, and
  (2) a resin layer of copolyester or copolyester ether containing an ester-forming alkali metal salt of sulfonic acid compound, the layer being laminated on at least one side of the oriented polyester film.

26. The composite polyester film of claim 25, in which the ester-forming alkali metal salt of sulfonic acid compound is sodium sulfoisophthalate or sodium sulfoterephthalate.

27. The composite polyester film of claim 25, in which the resin layer has a thickness of 0.005–1.0 μm.

28. The composite polyester film of claim 25, in which the surface roughness of the resin layer is in the range of 0.003–0.020 μm.

29. A magnetic recording medium comprising a magnetic layer formed on at least one side of the composite film of claim 25.

* * * * *

UNITED STATES PATENT AND TRADEMARK OFFICE
CERTIFICATE OF CORRECTION

PATENT NO. : 4,590,119
DATED : May 20, 1986
INVENTOR(S) : Ken-ichi Kawakami, Masaru Suzuki & Hotsuma Okasaka It is certified that error appears in the above-identified patent and that said Letters Patent is hereby corrected as shown below:

Claim 3, line 1, after "claim" insert --1--.

Signed and Sealed this

Thirty-first Day of March, 1987

Attest:

DONALD J. QUIGG

*Attesting Officer*    Commissioner of Patents and Trademarks